United States Patent Office 2,742,416
Patented Apr. 17, 1956

2,742,416
METHOD OF ETCHING TANTALUM

Alfred L. Jenny, Glens Falls, N. Y., assignor to General Electric Company, a corporation of New York No Drawing. Application December 17, 1952,
Serial No. 326,601

5 Claims. (Cl. 204—141)

This invention relates to a method of etching tantalum. More pjarticularly, it relates to a method of etching tantalum capacitor electrodes.

It is known that improvements may be effected in electrolytic capacitors by etching the surface of their electrodes or armatures. Etching materially increases the effective area of the surface of the electrodes and thereby correspondingly increases the electrical capacity per unit of projected electrode area or the capacity value for a given electrode size.

The use of tantalum metal electrodes in electrolytic capacitors produces a device having more stable electrical characteristics and a longer life as compared with similar capacitors containing electrodes of other metals, such as aluminum, for example. Tantalum being an expensive metal, it is desirable that a maximum surface area per unit weight be obtained in order that the amount of tantalum metal per unit capacitance shall be a minimum. Unfortunately, however, tantalum is a very inert material and, as a result, most of the known methods of etching metals have not been successful when applied to tantalum, resulting either in little or no attack at all or in a polishing action which, of course, may actually decrease the effective area of the original surface.

A successful method of etching tantalum to obtain a product having an etch ratio of 1.5 or more is described and claimed in the copending application Serial No. 236,128, filed July 11, 1951, in the names of Ralph A. Ruscetta and Alfred L. Jenny, now abandoned assigned to the same assignee as the present invention. The method described in that application comprises electrolytically etching the tantalum in an electrolyte comprising a solvent mixture essentially including methanol and a trace of water and a methanol-soluble inorganic salt dissolved in the solvent mixture.

The present invention is based on the discovery that tantalum can also be successfully etched in an electrolytic bath comprising a solution of an inorganic salt in a solvent component consisting essentially of a methanol-free mixture of formamide and a trace of water, i. e., from about 9500 to 11,000 parts, by weight, of water per million parts of solution. Preferably, the solvent consists entirely of formamide and the prescribed amount of water, but other inert organic liquids which are miscible with formamide may be employed in combination with formamide provided the solvent contains at least a major proportion, by weight, of formamide.

It is, of course, essential that the salt employed will be such that the resultant solution will be non-film forming, i. e., does not form a protective oxide or other film on the tantalum. It has been found that the formamide-water solutions of inorganic formamide-soluble halides, and particularly the fluorides and bromides, are especially useful and the specific features of the invention will generally be described with reference thereto. Examples of suitable fluoride and bromide salts are ammonium bromide, ammonium fluoride, ammonium bifluoride, lead fluoride, calcium fluoride, sodium fluoride, copper fluoride and beryllium fluoride. Examples of other salts which may be employed are formamide-soluble chlorides, thiocyanates, nitrates, etc., such as nickel chloride, ferric chloride, ammonium thiocyanate, lithium chloride, cupric nitrate, potassium thiocyanate, potassium bromide, sodium iodide, etc. Either ammonium bromide, ammonium fluoride or ammonium bifluoride or a combination of the fluorides are preferred since the ammonium fluorides and bromides are quite soluble in formamide and thus give electrolyte solutions of high conductivity with a low voltage drop across the electrolytic cell.

As the water content of the bath has been found to be critical, any water contained in the component raw materials is to be taken into consideration in preparing the bath. For example, some of the commercial grades of formamide and many salts contain significant amounts of water, in some cases more than the maximum amount specified hereinbefore. In such cases, part or all of the water should be removed from the raw materials before they are dissolved in the formamide. On the other hand, if the water content of the electrolytic bath is too large, it can be adjusted by the addition to the bath of additional formamide or other compatible solvent components free or substantially free of water. One such material, which is commercially available in a relatively water-free state and which has been found to be useful for this purpose, is dimethyl formamide.

As a specific example of how the etch ratio is affected by water content of the electrolytes, samples of one-half mil cold-rolled tantalum foil electrodes, all of the same area, were immersed as the anode in solutions of ammonium bifluoride in formamide or formamide and dimethyl formamide differing only as to their water content. The samples in each solution were subjected to a current of 0.2 amperes equivalent to a current density of 10 amperes per square foot for a period of ten minutes. The variations of etch ratio with water content of the solutions are tabulated in Table 1.

Table 1

| Percent by Weight | | | | (p. p. m.) Total Water | Etch Ratio @ 75 D.-C. |
|---|---|---|---|---|---|
| Practical Formamide | Dimethyl Formamide | Ammonium Bifluoride | Added Water | | |
| 91.87 | 0 | 8.13 | 0 | 6,390 | 1.20 |
| 91.82 | 0 | 8.12 | 0.06 | 6,960 | 1.18 |
| 91.76 | 0 | 8.12 | 0.12 | 7,540 | 1.145 |
| 91.72 | 0 | 8.11 | 0.17 | 8,120 | 1.09 |
| 91.60 | 0 | 8.11 | 0.29 | 9,280 | 1.28 |
| 91.49 | 0 | 8.10 | 0.41 | 10,400 | 1.81 |
| 89.00 | 2.73 | 7.87 | .40 | 10,300 | 1.76 |
| 86.70 | 5.18 | 7.68 | .39 | 10,090 | 2.45 |
| 84.70 | 7.42 | 7.50 | .38 | 9,940 | 2.16 |
| 82.91 | 9.38 | 7.34 | .37 | 9,790 | 1.70 |
| 77.27 | 15.54 | 6.84 | .35 | 9,300 | 1.07 |

The tabulated results show that the etch ratio obtained is a function of the water content of the electrolyte, and that best results are obtained with solutions containing at least about 9500 p. p. m. (parts per million) water. The term "practical formamide" refers to a technical grade of formamide readily available on the market. The voltage given for the "etch ratio" is the voltage to which samples were oxidized for test purposes.

In Table 2 are given the results of a series of experiments to determine the maximum permissible water content. The current, time and other conditions in this series were the same as those employed in the above described series.

Table 2

| Percent by Weight | | | (p. p. m.) Total Water | Etch Radio @ 75 Volts D.-C. |
|---|---|---|---|---|
| Practical Formamide | Ammonium Bifluoride | Water Added | | |
| 91.87 | 8.13 | 0 | 5,250 | 1.16 |
| 91.76 | 8.12 | 0.12 | 6,390 | 1.12 |
| 91.60 | 8.11 | 0.23 | 7,540 | 1.10 |
| 91.55 | 8.10 | 0.35 | 8,690 | 1.18 |
| 91.45 | 8.09 | 0.46 | 9,820 | 1.70 |
| 91.34 | 8.08 | 0.58 | 10,980 | 1.88 |
| 91.23 | 8.07 | 0.70 | 12,100 | 1.03 |
| 91.13 | 8.06 | 0.81 | 13,270 | 1.12 |

It will be noted that when the water content exceeds 12,000 p. p. m. the etch ratio is very poor. In general, the water content of the electrolyte preferably should not exceed about 11,500 p. p. m. The fact that only a limited amount of water can be tolerated to obtain the proper etching is perhaps best understood when it is considered that anodic treatment of tantalum in a purely aqueous solution of a salt such as ammonium bifluoride results in no significant etching action but rather causes the formation of protective oxide film on the tantalum surface.

The effect of any particular water content will vary to some extent by varying the current density but, generally speaking, a satisfactory etch ratio within the contemplation of this invention may be realized by employing a current density within the total range of 5 to 50 amperes per square foot with a preferred range of 10–20 amperes per square foot at optimum water content.

As would be expected, an increase in temperature of the etching solution results in more active etching. Generally, however, the etching process may be satisfactorily carried out within the total range of 20–65° C. As would also be expected, the degree of etch will vary with the total time of treatment while the voltage required will vary with the specific conductivity or resistivity of the etching solution and the spacing between the anode and cathode.

As has been previously indicated, formamide-soluble salts other than ammonium fluoride may successfully be employed to etch tantalum to an etch ratio of at least 1.5 provided the proper quantity of water is prsent in the etching solution. In some cases, the minimum amounts of water required to obtain the desired etch ratio may be substantially increased when these other salts are substituted for the fluorides.

It will be apparent that the conductivity of the etching solution and hence the time necessary for a given degree of etch will vary in accordance with the quantity of a given soluble salt in the solution. The present invention is not limited to any given salt concentration provided there is sufficient salt present to produce a conductive cell or, in other words, sufficient to pass current of the minimum density necessary to carry out the etch in a given time of treatment. The maximum quantity of salt which can be used is that providing a saturated solution thereof, and with such solutions a given degree of etch is obtained in a minimum length of time.

What I claim as new and desire to secure by Letters Patent of the United States is:

1. The method of electrolytically etching tantalum which comprises making the tantalum the anode in an electrolyte solution consisting essentially of a solvent composed of formamide and from 9,500 to 11,500 p. p. m. by weight of water, and a formamide-soluble-non-film forming inorganic salt dissolved therein.

2. The method of electrolytically etching tantalum which comprises making the tantalum the anode in an electrolyte solution consisting essentially of a solvent composed of formamide and from 9,500 to 11,500 p. p. m. by weight of water, and a formamide-soluble inorganic halide dissolved therein.

3. The method of electrolytically etching tantalum which comprises making the tantalum the anode in an electrolyte solution consisting essentially of a solvent composed of formamide, from about 9,500 to 11,500 p. p. m. by weight of water, and sufficient ammonium halide dissolved therein for the passage of a current between a cathode and the anode.

4. The method of electrolytically etching tantalum which comprises making the tantalum the anode in an electrolyte solution consisting essentially of a solvent composed of formamide and from 9,500 to 11,500 parts per million by weight of water, and sufficient of an ammonium fluoride dissolved therein to provide a solution having a conductivity capable of passing a current therethrough.

5. The method of electrolytically etching tantalum which comprises making the tantalum the anode in an electrolyte solution consisting of formamide, dimethyl formamide, from 9,500 to 11,500 parts per million by weight of water, and sufficient of ammonium bifluoride dissolved therein to provide a solution having a conductivity capable of passing a current therethrough.

References Cited in the file of this patent

"Zeitschrift Elektrochemie," vol. 39 (1933), pages 731–735, article by Schupp.